(12) United States Patent
Salada

(10) Patent No.: US 12,353,626 B2
(45) Date of Patent: Jul. 8, 2025

(54) HAPTIC HAND CONTROLLER SYSTEM FOR MIXED REALITY

(71) Applicant: Distal Reality LLC, Denver, CO (US)

(72) Inventor: Mark A. Salada, Denver, CO (US)

(73) Assignee: Distal Reality LLC, Denver, CO (US)

( * ) Notice: Subject to any disclaimer, the term of this patent is extended or adjusted under 35 U.S.C. 154(b) by 0 days.

(21) Appl. No.: 18/322,584

(22) Filed: May 23, 2023

(65) Prior Publication Data

US 2023/0297170 A1    Sep. 21, 2023

Related U.S. Application Data

(63) Continuation of application No. 17/736,086, filed on May 3, 2022, now Pat. No. 11,698,682.

(Continued)

(51) Int. Cl.
*G06F 3/01* (2006.01)
*G06F 3/16* (2006.01)

(52) U.S. Cl.
CPC .............. *G06F 3/016* (2013.01); *G06F 3/014* (2013.01); *G06F 3/167* (2013.01)

(58) Field of Classification Search
CPC .... G06F 3/016; G06F 3/014; G06F 2203/013; G06V 40/113
See application file for complete search history.

(56) References Cited

U.S. PATENT DOCUMENTS 5,945,978 A    8/1999  Holmes
9,104,271 B1*  8/2015  Adams .................. G06F 3/0233
(Continued)

FOREIGN PATENT DOCUMENTS

WO    2017/178121 A1    10/2017

OTHER PUBLICATIONS

International Search Report and Written Opinion of the International Searching Authority, issued in connection with Int'l Appl. No. PCT/US2022/027537, dated Aug. 18, 2022 (9 pages).

(Continued)

*Primary Examiner* — Phuong H Nguyen

(74) *Attorney, Agent, or Firm* — Holland & Hart LLP

(57) ABSTRACT

The technology disclosed herein includes a controller or device that provides multi-dimensional hand interaction with the digital world by delivering physical sensations to the palm and the fingertips. The device translates motion from the hand and fingers to control of a computer device, while simultaneously receiving signals to display haptic sensations. The device is "controller-held" around a user's hand, holding onto hand anatomy at key locations. In some embodiments, the device has one-handed engagement and disengagement. In some embodiments, the device may be used as a game controller, incorporating WebVR electronics and software, wireless communication, power-harvesting electronics, inertial measurements unit electronics including additional inputs for camera-based IMU supplementation, battery recharging electronic and internal communication protocol support electronics. In some embodiments, the device may be used in non-gaming environments, and include additional electronics that support universal remote controller components, IoT compatibility, and compatibility for wireless charging.

19 Claims, 13 Drawing Sheets

Related U.S. Application Data

(60) Provisional application No. 63/183,602, filed on May 3, 2021.

(56) References Cited

U.S. PATENT DOCUMENTS

| | | |
|---|---|---|
| 10,137,362 B2 | 11/2018 | Buchanan et al. |
| 10,534,433 B1 | 1/2020 | Agarwal et al. |
| 10,838,486 B2 | 11/2020 | Gonzalez et al. |
| 2003/0234823 A1* | 12/2003 | Sato .................. G06F 3/0346 715/848 |
| 2014/0336669 A1* | 11/2014 | Park .................. A61B 34/30 606/130 |
| 2016/0054798 A1 | 2/2016 | Messingher et al. |
| 2017/0168565 A1 | 6/2017 | Cohen et al. |
| 2018/0284896 A1 | 10/2018 | Kearney et al. |
| 2018/0335842 A1 | 11/2018 | Rubin et al. |
| 2019/0094965 A1 | 3/2019 | Buchanan |
| 2019/0101982 A1 | 4/2019 | Tsuto |
| 2019/0204921 A1 | 7/2019 | Goupil et al. |
| 2019/0391648 A1 | 12/2019 | Park et al. |
| 2020/0375287 A1 | 12/2020 | Ben-Tzvi et al. |
| 2021/0232222 A1 | 7/2021 | Tsuto |

OTHER PUBLICATIONS

European Patent Office, "Extended Search Report," issued in connection with European Patent Application No. 22799462.1 dated Feb. 7, 2025 (11 pages).

\* cited by examiner

HAPTIC HAND CONTROLLER SYSTEM FOR MIXED REALITY

CROSS-REFERENCE TO RELATED APPLICATIONS

The present Patent Application is a continuation of U.S. patent application Ser. No. 17/736,086, entitled "HAPTIC HAND CONTROLLER SYSTEM FOR MIXED REALITY," filed May 3, 2022, which claims the benefit of U.S. Provisional Patent Application No. 63/183,602, entitled "HAPTIC HAND CONTROLLER SYSTEM FOR MIXED REALITY," filed on May 3, 2021, which is specifically incorporated by reference herein for all that it discloses or teaches.

SUMMARY

The technology disclosed herein includes a computer peripheral, game, and or Internet of Things (IoT) controller (controller) that provides multi-dimensional hand interaction with the digital world while delivering physical sensations to the hand and the fingertips by way of a wireless or internet based service. The controller translates user intent, usually measured as motion or force from the hand and fingers, to control a graphical user interface of a computer or virtual reality (VR) headset. As opposed to a hand-held computer mouse or joystick, the controller clasps to a user's hand, holding onto select hand anatomy. In some embodiments, the controller has one-handed engagement and disengagement. In some embodiments, the controller may be used as a game controller, incorporating WebVR electronics and software, wireless communication, power-harvesting electronics, inertial measurements unit electronics including additional inputs for camera-based IMU supplementation, battery recharging electronic, and internal communication protocol support electronics. In some embodiments, the controller may be used in non-gaming environments and include additional electronics that support universal remote controller components, IoT compatibility, and compatibility for wireless charging.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

These and various other features and advantages will be apparent from a reading of the following Detailed Description.

DETAILED DESCRIPTION

Figure 1:
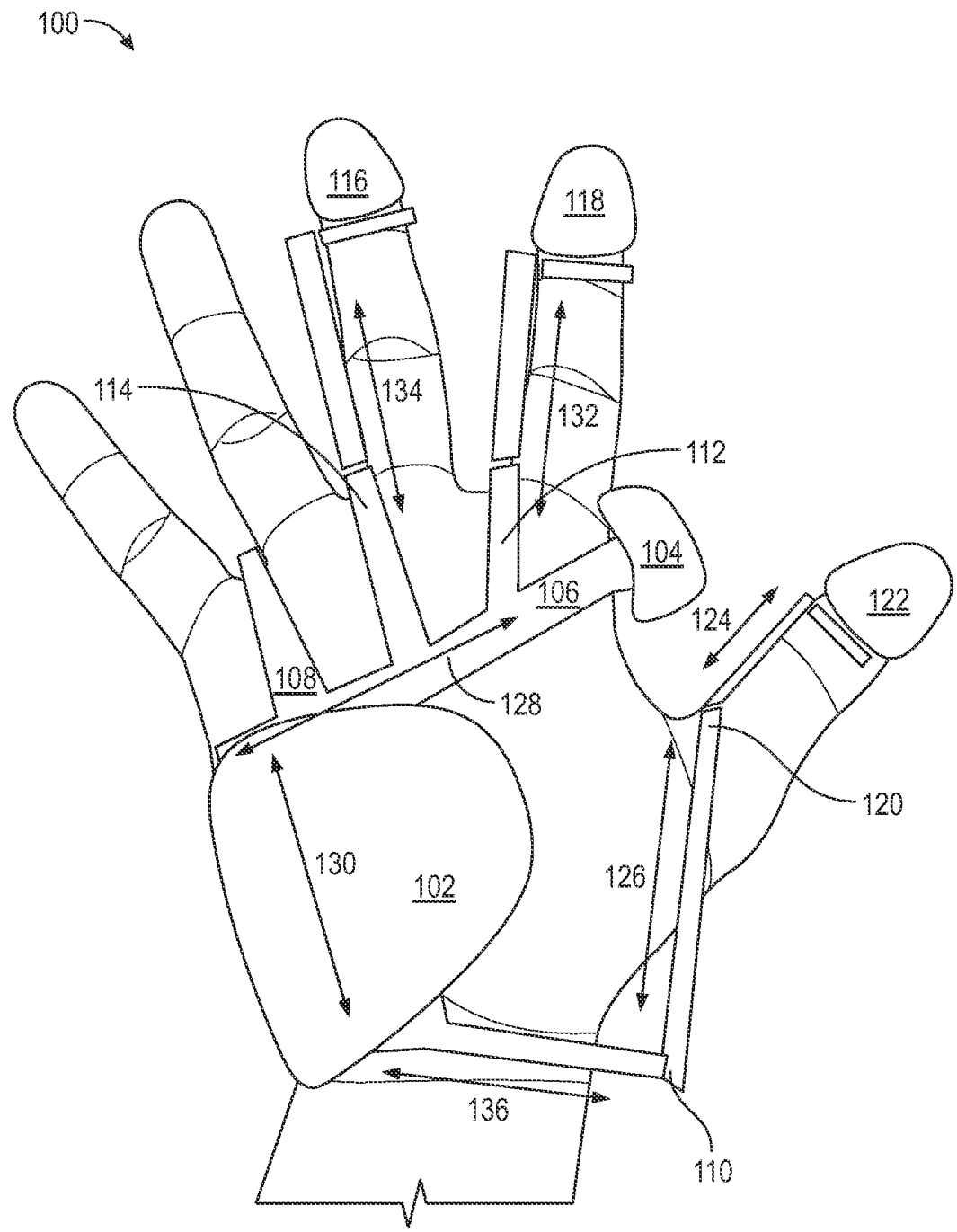
FIG. 1 is a diagram of an example controller on a user's hand.

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular implementations, it should be appreciated that the features described with respect to one implementation may be incorporated with some other implementations as well. Similarly, no single feature or features of any described implementation should be considered essential to the invention, as some implementations of the invention may omit such features.

For the purposes of this disclosure, the term "user intent" refers to any measurement of a user's applied hand or finger force, finger or hand pose, finger or hand position, or finger or hand motion, and may also include supplemental signals such as vocal commands or other digital input as gathered through the wireless or wired computer interface on the controller.

For the purposes of this disclosure, the term "hand clasp" refers to the gripping action performed by the controller on a user's hand and or wrist.

In some embodiments, the hand clasp refers to the simultaneous gripping action performed by the controller on both the ulnar and radial sides of the palm. In some embodiments, the hand clasp refers to gripping on both the ulnar and radial sides at the wrist. In some embodiments, the hand clasp refers to completely embracing the hypothenar eminence on the palm and dorsal surfaces. In some embodiments, the hand clasp refers to the palm securing point at the proximal knuckle between the fourth and fifth finger.

Examples of the hand clasp are described in more detail below with respect to a "hypothenar eminence clasp," a "proximal index base clasp," a "proximal fourth finger clasp," and a "radial wrist clasp."

For the purposes of this disclosure, the term "finger mechanism" or "thumb mechanism" refers to all mechanical or electromechanical components connecting the fingertip component or thumb component at the distal end to the transverse structure that extends across the palm and connects the son the ulnar and radial sides of the hand clasp mechanism, which may comprise one or more pieces hinged together or secured as a mechanical flexure.

For the purposes of this disclosure, the term "fingertip component" or "thumb component" refers to the electromechanical sensor and actuator unit encapsulating the user's finger or thumb pad, which may connect to the distal end of the finger mechanism as a mechanical or electrical interface and is the means for displaying haptic sensations to the finger pad or thumb pad as well as measuring user intent at those locations.

For the purposes of this disclosure, the term "transverse structure" refers to the mechanical support that lies between the ulnar and radial hand clasps on the palm side, connecting the two, but also serving as the base connection points for the finger mechanisms. In some embodiments, the "transverse structure" follows the user's transverse palm crease and is mechanically connected to or potentially even the same piece that extends on the palm side of the hypothenar eminence clasp and to the radial side of the wrist, proximal to the thenar eminence.

For the purposes of this disclosure, the term "hint," an abbreviation of the term 'haptic interaction,' is a code or a set and or sequence of commands to or from a human interface device (HID). The hint together with sensor signals and software algorithms can display finger position and motion as well as tactile and kinesthetic touch sensations to the user's hand and fingers simultaneously. In some embodiments, a hint may include the transmission or reception of a short code, or encrypted code, that triggers an existing set or sequence of sensor signals, software algorithms, and actuator commands for the display of touch sensations on an HID. In some embodiments, a hint may include a set or sequence of commands and sensory signals that force the user to experience touch sensations built-in or inherent to the HID, such as a passive haptic detent inherent in a mechanical button press. In some embodiments, a hint includes sensory signals from a remote device, void of any associated commands, allowing a receiving HID complete freedom to interpret and translate the sensory signals into arbitrary commands for position, motion, and or haptic display.

In some embodiments, a hint is sensory and/or control signals intended to impart a haptic sensation on the user of an HID, such as the disclosed device, for the purposes of controlling, discovering, searching, manipulating, or interpreting the nature or state or mode or action of a product or products on another, possibly remote device or object. In some embodiments, the content of a hint may originate from, or be displayed on, a device or object in physical contact with a transmitting or a receiving HID.

In some embodiments, a hint may include a direct representation of an aspect of an existing product attempting to recreate or establish a sensation available to users in direct physical contact with the device, such as, but not limited to, an on/off switch or volume knob. A hint may include an entirely new touch sensation associated with the interaction and control of a product, as in a sensory substitution. In one example, the hint may include a 'wake up' sensation, or a reminder (events that have no inherent physical touch sensation). In some embodiments, a hint may directly represent the physical position or motion of a hand employing sign language, thus representing linguistic characters, words, or phrases for the purposes of communication.

The Haptics of Things, or HoT, is a communication network service that facilitates any digital wireless exchange of hints between a device or object and an HID, or between a virtual or augmented representation of a device or object and an HID, including hint exchanges between HIDs, specifically including the disclosed device.

In some embodiments, an HID may stream hints in real-time through wireless communication based on another device or HID. When an HID such as the disclosed device receives or transmits a hint to another similar device or devices, or when exchanging hints with a third-party electronics product, the disclosed device becomes a node on the HoT.

In some embodiments, the content of a hint specifically associated with an object or product or event resides remotely on a computer server also connected wirelessly as a node on the HoT and may be accessed by another node on the HoT.

In some embodiments, the disclosed technology includes a computer interface apparatus. The computer interface apparatus performs computer input functions (e.g., human interface device, or HID), and computer output functions in the form of physical sensations to a user's palm and fingertips. However, as opposed to sliding a mouse on a tabletop, or equivalently sliding one's fingers on a trackpad or screen (both inherently two-dimensional interactions), the disclosed technology allows for multi-dimensional hand and finger interaction with the digital world. The ability to interact in a natural way contributes to greater "hand presence" in the virtual and augmented environments.

Additionally, the controller provides physical sensations to the user's hand and fingertips in a way not previously combined in a computer interface. The controller can simultaneously display haptic sensations to the user's hand and to individual fingertips in concert with the user's hand, finger, and thumb motion or position. These additional dimensions of haptic display are provided by the controller in a manner that is easy to engage and disengage due to single-handed and immediate hand clasp ability. Exceeding the typical user input convention of push-buttons or mini-joysticks, the controller enables natural open hand gestures and individual finger interactions with any computer interface.

In some embodiments, to measure and stimulate the user's hand and fingers in an effective and uninhibited way, the controller acts similarly to a skeleton of a full hand glove, holding on to hand anatomy at select locations while still enabling the user to manipulate and grasp real-world objects.

FIG. 1 is a diagram of an example controller on a user's hand 100, illustrating the ulnar side and radial side conventions, and the select anatomy where the controller contacts or clasps to the user's hand.

The components of an example controller on a hand include: a hypothenar eminence clasp 102, a proximal index base clasp 104, a transverse structure 106, a proximal fourth finger clasp 108, a radial wrist clasp 110, an index finger mechanism 112, a middle finger mechanism 114, a middle fingertip component 116, an index fingertip component 118, a thumb mechanism 120, and a thumb component 122.

The controller has a hypothenar eminence clasp 102 that clasps the user's palm on the hypothenar eminence (both palmar and dorsal sides, i.e., top and bottom) of the hand and a proximal index clasp 104 located on the opposite side of the user's palm at a proximal base of an index finger. A transverse structure 106 is a thin, curved structural piece that extends along the transverse of the hand creases on the palm side. In some cases, the transverse structure 106 may be rigid, as well as other components of the controller. The transverse structure 106 connects the hypothenar eminence clasp 102 and the proximal index clasp 104, and also supports the base of the finger mechanisms (e.g., index finger mechanism 112, middle finger mechanism 114, etc.). Some embodiments may include two additional extrusions (small curved posts) that help secure the hand: a first extrusion 108 extends from the transverse structural piece 106 between the pinky and ring fingers (fourth and fifth fingers), and a second extrusion 110 extends from the hypothenar clasp on the radial side wrist crease. The extension of the hypothenar eminence clasp to the extrusion 110 is the wrist seat-At the terminus of the wrist seat is the extrusion 110 which may also serve as the base connection for the thumb mechanism 120. Some embodiments may have the thumb mechanism 120 support the thumb component from the dorsal or the radial side of the thenar eminence. The fingertip components 116 and 118 connect mechanically and electrically to the distal ends of their respective finger mechanisms via attachment posts and are detachable. The thumb component 122 correspondingly connects to the thumb mechanism 120 and is also detachable.

Arrows in the FIG. 1 illustrate the minimally seven example adjustable dimensions of an example controller. The minimum adjustable dimensions include a distal thumb segment 124, a proximal thumb segment 126, a transverse structure length 128, a wrist seat distance from the transverse structure 130, an index finger length 132, a middle finger length 134, and a wrist seat width 136, the relative angle between the thenar eminence clasp and the transverse structure, and an angle A is fixed (as well as finger mechanism angles from the transverse structure). In other embodiment, additional adjustable dimensions may be included with the controller.

The finger and thumb mechanisms (as described herein) may hinge (with or without tension) at both the transverse structure connection, i.e., the proximal base of the mechanism, the mid-finger joint. In some cases, a flexion (e.g., capable or bending or curving, or the condition of being bent or curved) or a hinge may provide movement to a portion of the example controller. Lying between the fingers, the finger mechanisms 112 and 114 serve as mechanical support and electrical conduits for the fingertip components. In some embodiments, measurement and or digital control electronics (such as an optical emitter for remote control) may reside on the finger mechanisms. Positioned either radial to the thenar eminence, or dorsal to the thenar eminence, the thumb mechanism 120 serves as mechanical and electrical support for the thumb component. At the distal end of the fingertip and thumb mechanisms 112 and 114 and 120 is a post that extends across the corresponding finger or thumb, positioned nominally at the at the distal crease of the finger. This post serves as a potential sensing and actuating interface (haptic display) for the finger or thumb (like a trigger), but also as a potential mechanical mount and electrical junction for the fingertip and thumb components.

In some embodiments, a finger mechanism may be comprised of two or more printed circuit boards serving as the mechanical structural members, where the relative rotation actuation is electromagnetic interaction by, with permanent magnets surrounded by coils on one printed circuit board that may enhance or cancel the magnetic attraction with other magnets or coils on the other board, thus allowing for discrete electrical torque The torque control actuation at the joint produces a lateral force against the fingertip either at the mounting post or the fingertip component if attached. (impedance) control. In some embodiments, the finger mechanisms may be passively tensioned against the user's fingers. For example, in some embodiments, the finger mechanisms may be passively tensioned against the user's fingers with constant-force spring steel coil. The magnets and corresponding coils in the boards also provide the means to harvest electrical power from the user's finger movements. When the user bends their finger, the rotational motion at the joint passes the permanent magnets from one board over the electrical coils on the other board, thus generating electrical current that can be captured and stored with electronic components. As an additional power harvesting means, the boards support a hard-stop mount where piezo elements reside which generating an electrical voltage difference when the user grips tightly. The changing voltage is then used to collect electrical current.

Figure 2B:
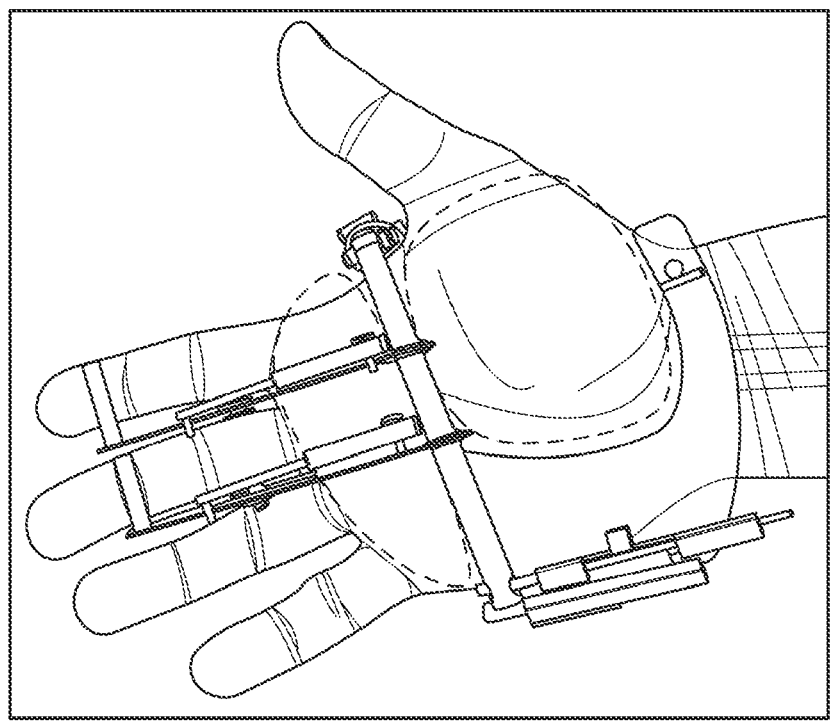
FIGS. 2A and 2B are diagrams of an example dual hinge fit controller.
Figure 2A:
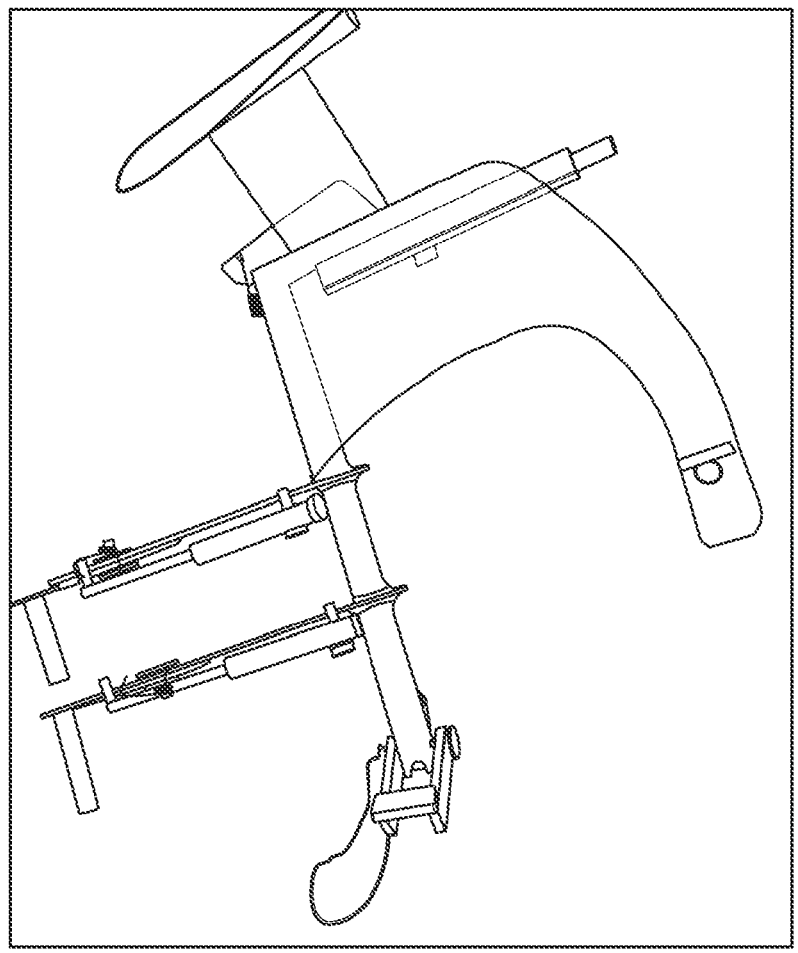

FIGS. 2A and 2B are diagrams of an example dual hinge fit controller 200. The finger mechanisms show a prototype of both the primary and alternate methods of implementation, and the hypothenar eminence clasp 102 is comprised of circuit board material to house the majority of the controller's electrical components. The thumb mechanism, fourth finger extrusion, radial wrist extrusion, and fingertip components shown in FIG. 1 are not shown in FIGS. 2A and 2B (however the fingertip component attachments posts are shown).

In some embodiments, a user's hand with an example controller holds (clasps) the palm side of a user's hand during use. The hypothenar eminence clasp 102 and the proximal index base clasp 104 connect to the transverse structure 106 with either one or two hinges, enabling the hand clasping action when the user presses down to engage the controller resting on a surface (or in some embodiments when the controller is hooked on another object). In some embodiments, a one or two-finger (fourth and fifth finger) release mechanism (not pictured) may simultaneously disengage both clasps (in the two-hinge embodiment) or the single hand the clasp (in the one-hinge embodiment). In some embodiments, the user's thenar, thenar eminence, and palm distal to the transverse crease movements are left unimpeded by the disclosed controller.

Figure 3A:
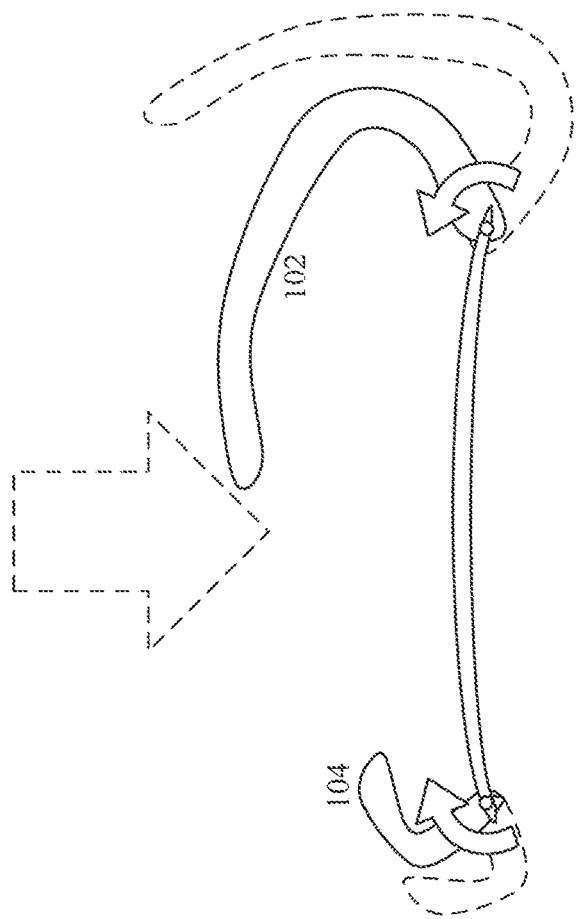
FIGS. 3A and 3B are schematic diagrams of the engagement/disengagement action of an example controller.
Figure 3B:
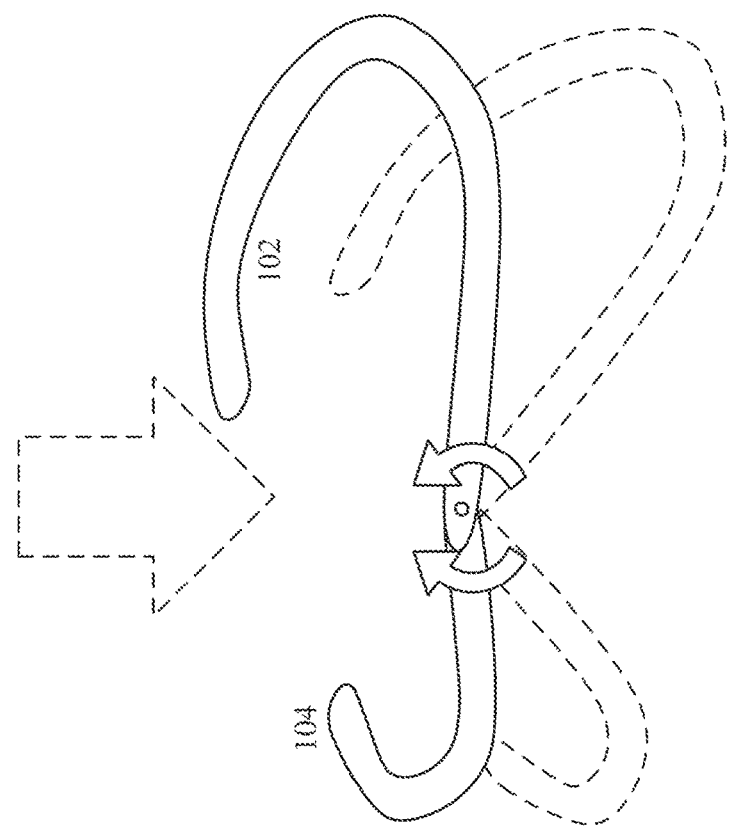

FIGS. 3A and 3B are schematic diagrams of the engagement/disengagement action of an example controller in the disclosed technology. As a user presses their hand downward into the controller (as depicted with the downward arrows), palm down the dorsal side of each clasp rotates about a hinge or hinges and closes around each respective side of the user's hand, finally mechanically latching into place. The resulting clasping action effectively secures the user's hand with a single motion of a single hand. FIGS. 3A and 3B illustrate two embodiments in which either one or two spring-loaded hinges comprise the hand clasp.

With a dual hinge embodiment in FIG. 3A, the proximal index joint clasp may operate independently and possibly with a different tension or speed than the hypothenar eminence clasp on the ulnar side of the palm. As an alternative embodiment, a mechanically simpler single hinge clasping action in FIG. 3B closes both hand clasps at the same speed and tension. Disengagement may be immediate with a fourth or fifth finger release switch or button (not pictured) that releases the hinge or hinges simultaneously, opening the clasps and allowing the hand to exit. With this capability, the disclosed controller effectively "holds on" to the's hand even when open user, as opposed to requiring the user to hold the controller.

In some embodiments, the clasps lay open when not engaged, allowing for top-down access to the device without having to move anything such as a securing strap out of the way beforehand. When engaged (when the user presses down and the clasps close) the device is secured to the hand while still allowing the user to open or close their grip and move the thumb and fingers with natural uninhibited freedom.

Figure 4:
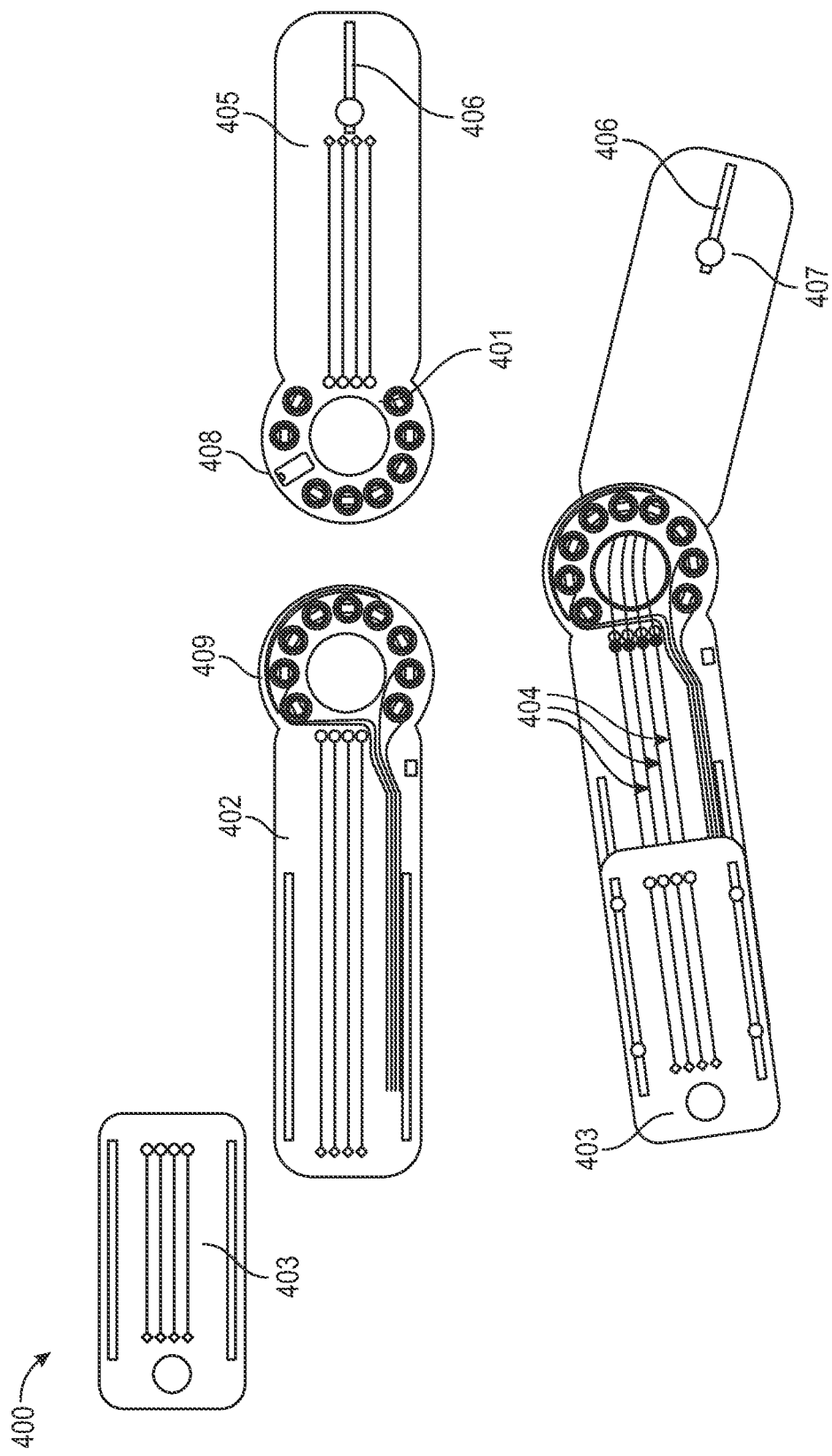
FIG. 4 is a set of schematic diagrams of finger mechanism boards in an example controller.

FIG. 4 is a set of schematic diagrams of finger mechanism boards 400 in an example controller. The diagrams illustrate the boards 400 connected by a bushing (hinge) 401 to comprise finger mechanism (constant force spring not shown). At the proximal end 402 of the boards is an adjustable, sliding contact printed circuit board 403 that provides the means to adjust the length of the finger or thumb mechanism for fit. The sliding contact allows electrical connection for both power and signal lines 404. At the distal end 405 of the fingertip mechanism is an adjustable position slot 406 intended to support the post 407 that extends across the corresponding finger. Finally, the finger or thumb mechanism mount board is mechanically hinged and electrically connected to the transverse structure.

In some embodiments, one of the operating modes of the controller is the ability to "stow" the controller on another object, e.g., the user's arm, by locking the finger mechanisms in a claw-like fashion. To enable this mode, the finger mechanism boards have a brake mechanism at the hinge 401 potentially comprised of a solenoid 408 with an eccentric post that wedges itself in a slot 409 on the other board to lock relative movement.

Figure 5:
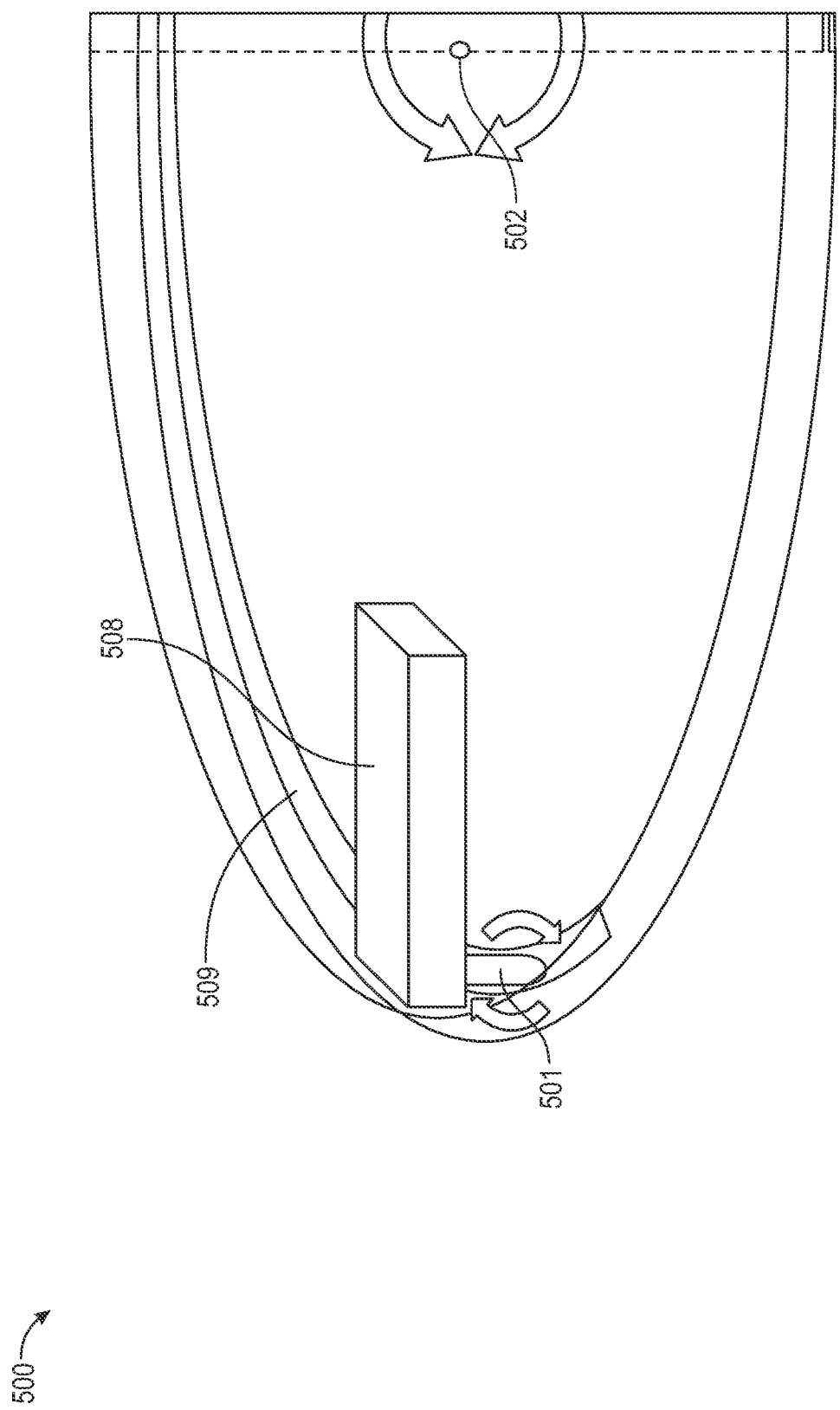
FIG. 5 is a perspective view of a finger brake solenoid in an example controller.

FIG. 5 is a perspective view of a finger brake solenoid 500 in an example controller. Specifically, the potential location of a finger brake mechanism at the proximal end of the distal finger board is shown. When the solenoid 508 is activated, the solenoid actuated eccentric post 501 twists about an axis 502 between 0 and 90 degrees. The resulting friction between the solenoid actuated eccentric post 501 on the distal board and the brake slot 509 on the proximal finger printed circuit board (or visa-versa) locks the boards from moving with respect to each other, enabling the controller to hold any relative angular position without exerting subsequent electrical power. The user may then disengage the hand clasp to effectively hook the controller on to an object for temporary stowage.

Figure 6:
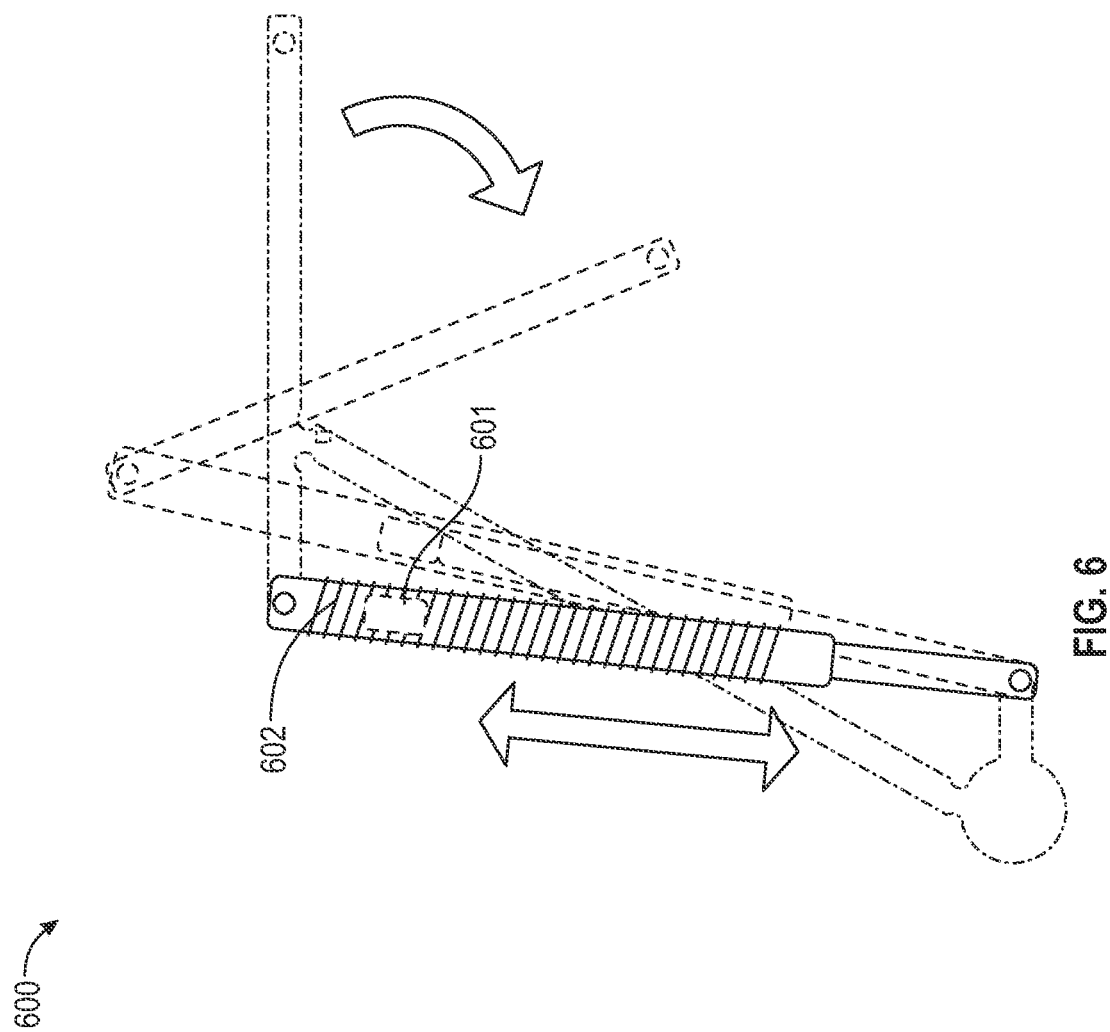
FIG. 6 is a schematic diagram of an example finger and thumb mechanism in an example controller.

FIG. 6 is a schematic diagram of second embodiment finger and thumb mechanism 600 in an example controller. In the embodiment of FIG. 6, a method of mechanically supporting and actuating the finger mechanisms employs a permanent magnet 601 attached to the end of a piston, inserted in a casing wrapped with an electrical coil 602 as part of a four-bar linkage. As the user bends their finger, the permanent magnet 601 on the piston moves within the encased electrical coil 602, generating electrical current that may be captured. Conversely, sending electrical current through the electrical coil 602 will interact with the permanent magnet 601, and force movement in the piston, thus applying force to the user's finger with the mechanical lever action of the four-bar linkage. Actuation and power harvesting from finger or thumb movement are electromagnetically controlled with the controller electronics. In some embodiments of the fingertip mechanism, the brake at the joint may be used to deliver haptic sensations to the finger with pulse width modulation (PWM). PWM control of the break, in combination with the finger mechanism under spring tension, enables independent control of the frequency and amplitude of periodic signals, which results in the display of a wide variety of kinesthetic and vibrotactile haptic sensations at the fingertip.

In some embodiments, permanent magnet 601 may be mounted at the end of the solenoid casing, where the internal traveling magnet reaches its full extent. These magnets may interact with the traveling magnet on the piston within the electrical coil 602 to produce an attraction/repulsion when the user bends a finger, delivering a haptic detent at the interaction point. One magnet may provide an attraction/repulsion force, while another magnet at the base of travel provides a repulsion force to prevent the traveling magnet from getting stuck. An electrical coil 602 may surround one or more of the magnets such that when electrical current is passed through the magnets, a counter-active magnetic field cancels the magnetic effect of the magnets under the control of the hand controller electronics. The canceled magnetic field enables the controller to eliminate the permanent magnet induced haptic detent on command from the controller's electronics.

Some embodiments of the electrical coil 602 that surrounds the piston have non-linear (e.g., uneven) wrapping that creates either a stronger or weaker electromagnetic force or power harvesting capability based on the unevenness of the coil wrapping. The available force is directly proportional to the number of turns in a solenoid based on the following equation:

$$F \sim (n \times i)$$

where F is the force, i is the electrical current, and n is the number of turns at a given cross-sectional area. For example, wrapping the electrical wire with exponentially increasing turns towards the proximal end of the throw would create a stronger electromagnetic power when the finger mechanism is at its full extent (straight). The increased number of turns may compensate for the mechanically weaker four-bar linkage angle, enabling greater authority to display haptic detents along the entire range of motion.

Figure 7B:
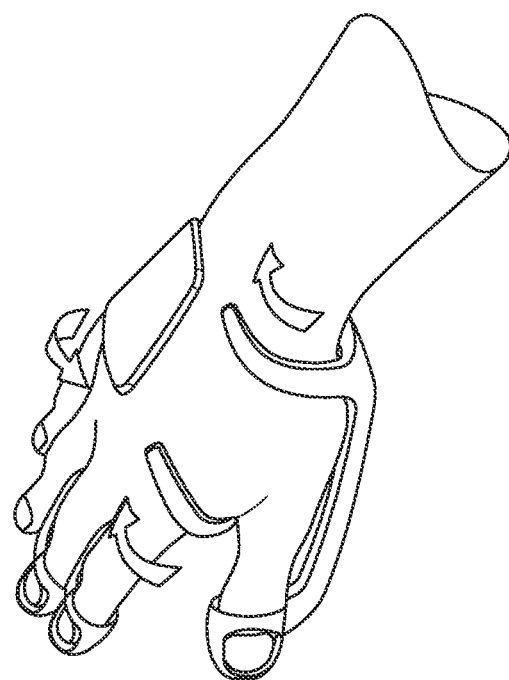
FIGS. 7A and 7B are illustrations of hand clasping action of an example controller.
Figure 7A:
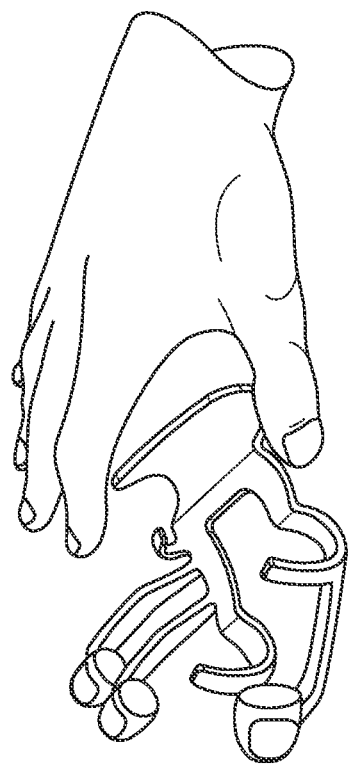

FIGS. 7A and 7B are illustrations of hand clasping action of an example controller 700. As shown in FIG. 7A, the controller is in the open position, resting on a surface. A user may employ its use in the open state as a computer peripheral device, sliding the device on the surface as with a conventional computer mouse. The controller is backwards compatible as a computer peripheral device. As shown in FIG. 7B, when the user desires more advanced interaction, pressing palm down on the controller brings the hand clasp around the hand with a singular motion and secures the controller to the user.

Figure 8:
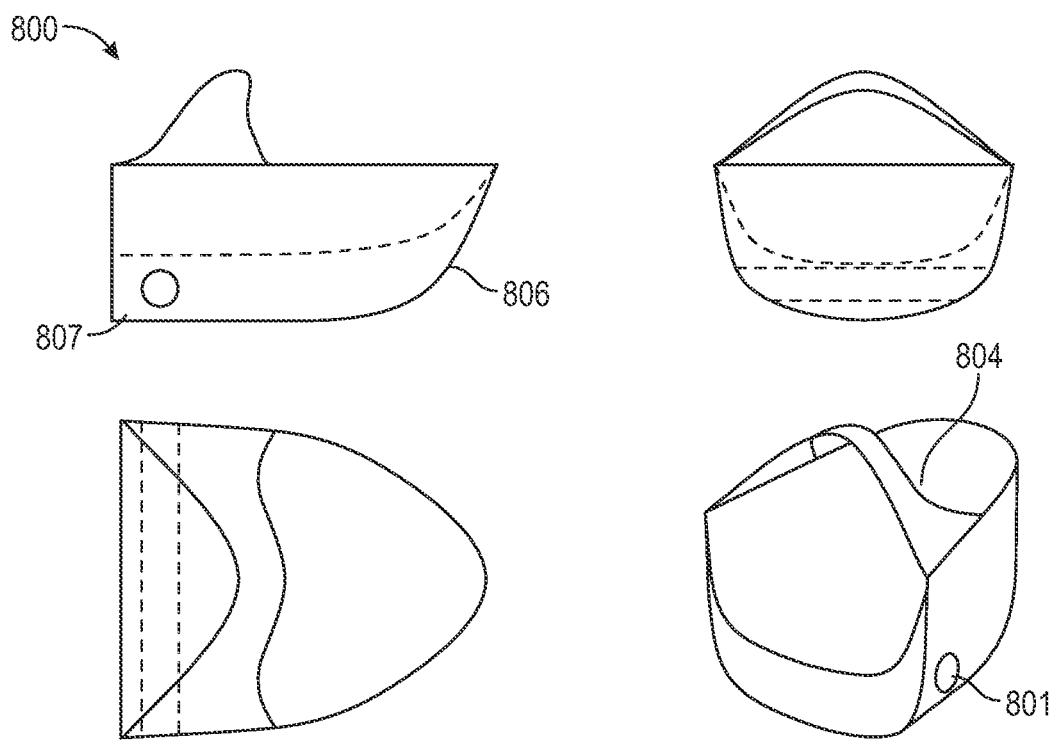
FIG. 8 is a set of schematic diagrams of fingertip and thumb components in an example controller.
Figure 8:
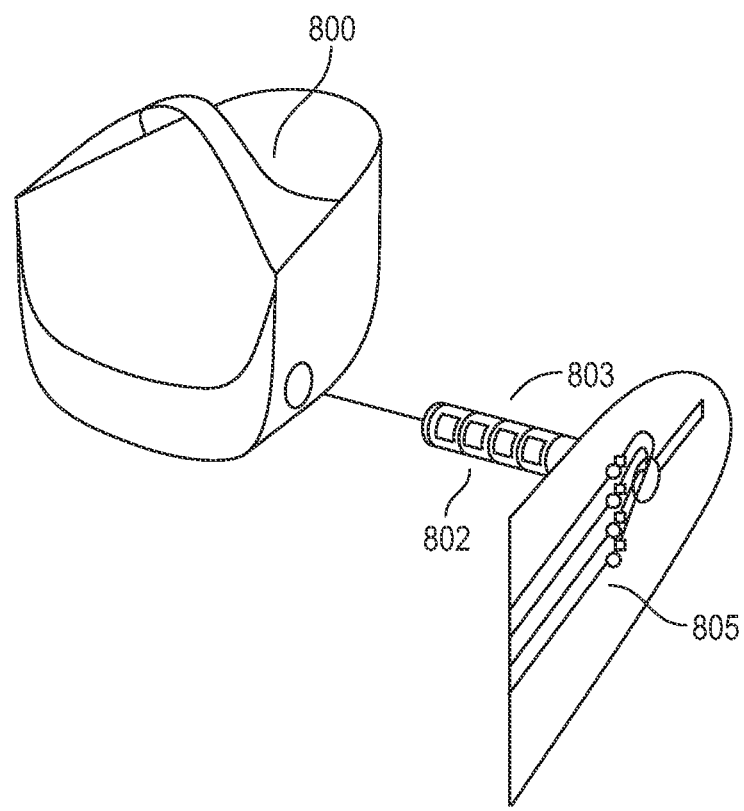

FIG. 8 is a set of schematic diagrams of fingertip or thumb components 800 in an example controller, including an example fingertip mechanism connecting to a fingertip component for a controller via the mounting post 803 at the distal end of the finger/thumb mechanisms 805.

The fingertip components may comprise a hole 801 to connect to the mounting post 803 at the distal end of the finger mechanisms 805, taking computer signals and power from the connection of snap-fit, spring loading and electrical contact features 802. The finger pad components display haptic sensations to the user's finger or thumb with a finger rest/haptic display surface 804, while providing a rubber contact surface 806 on the other side instrumented with a force sensor 807. Without the finger components, the disclosed controller still imparts forces and sensations to the user's finger through the mounting post 803 mounted to the distal end of the fingertip or thumb mechanisms 805, but as a trigger-like structure for the distal phalangeal joint.

Figure 9:
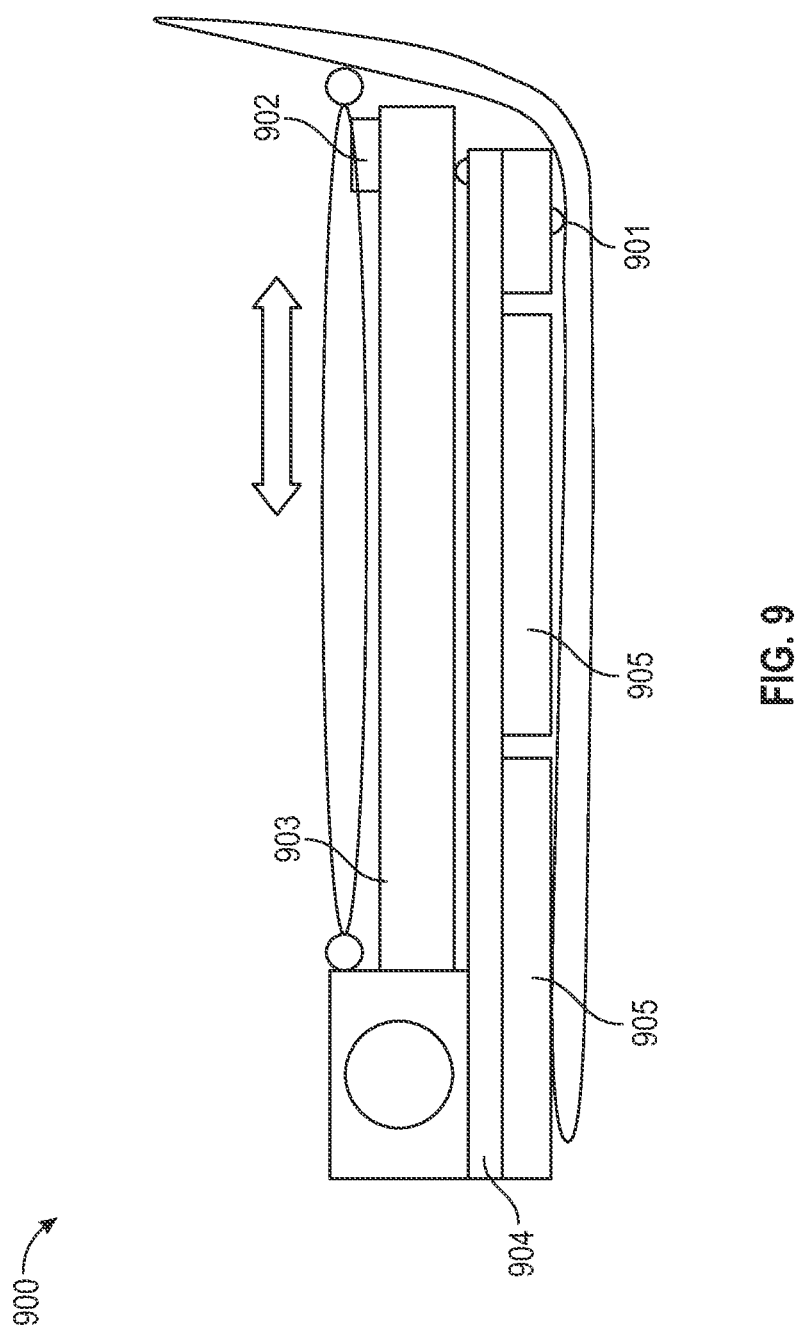
FIG. 9 is a schematic diagram of a cross-sectional view of a fingertip component in an example controller.

FIG. 9 is a schematic diagram of a cross-sectional view of a fingertip component 900 in an example controller. The fingertip component contains haptic display capabilities and force sensing mechanisms 901. In some embodiments, vibrotactile haptic feedback is accomplished with a piezo element 902 and a foam-supported finger pad surface 903 mounted on one side of a printed circuit board 904, with the controlling electrical components 905 and force sensing mechanisms 901 mounted on the other side of the board. Some embodiments of the haptic actuator in the fingertip component use shape memory alloy film or filament to pull the finger pad under control of the hand controller electronics, creating a transient haptic sensation. In some examples, the fingertip component may be approximately 1.5 cm long and approximately 0.5 cm high, however, other similar sizes and ranges are contemplated.

Figure 10:
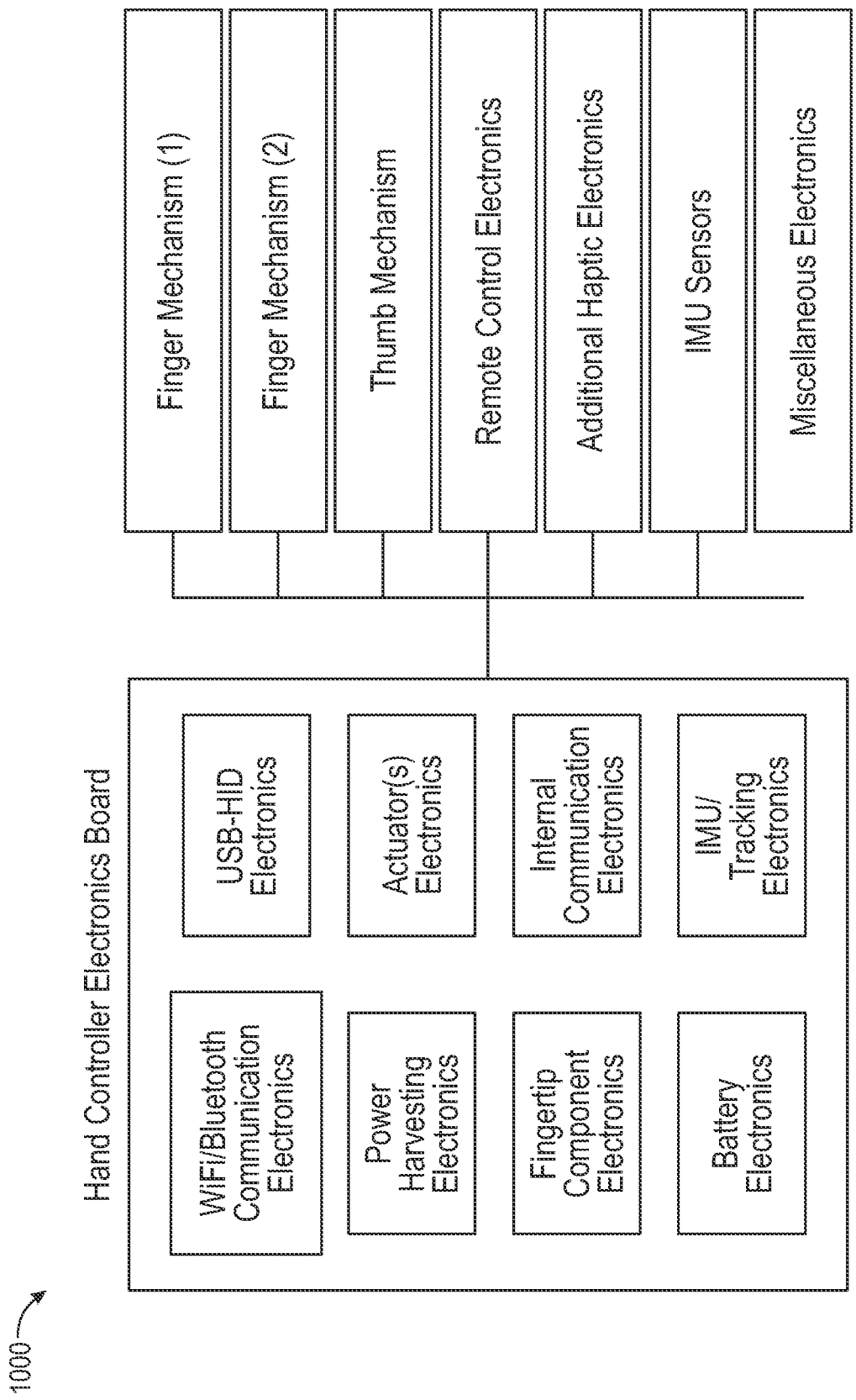
FIG. 10 is a block diagram of an electronics board in an example controller.

FIG. 10 is a block diagram of an electronics board 1000 in an example controller. In some embodiments, printed circuit boards (PCBs) may be part of the controller structure itself or mounted to the controller. The PCBs may include electronics for measuring the pose, motion, and applied force of the controller, as well as actuating any attached to the clasps or transverse structure or wrist seat, in addition to and separate from the finger and thumb mechanisms or (finger/thumb) tip component actuators-A central processing unit (CPU) may implement some or all of the functionality included in the electronics board components and controller mechanisms. In some embodiments, the controller may be used as a game controller. In some embodiments, the hand controller electronics board may include standardized USB-HID or WebVR electronics and software, as well as wireless communication such as Wi-Fi or Bluetooth, power-harvesting electronics, inertial measurement unit (IMU) electronics which include additional inputs for camera-based IMU supplementation, battery recharging electronics, and internal communication protocol support electronics. To collect analog signal measurements, the hand controller electronics board may also contain analog to digital (ADC) and corresponding filter electronic components in some embodiments. Additional electronics that support universal remote controller components, IoT compatibility, and wireless charging may be included.

In some embodiments, a primary feature of the controller is the modularity of the fingertip components. To support development that includes third-party haptic device developers, the on-board electronics include standardize haptic ICs like piezo drivers and servo-motor controllers to support linear resonant actuators (LRAs) or eccentric rotating motors (ERMs).

Some embodiments of the controller may provide interactions such as those typically taken with a conventional computer mouse, in some cases replacing interaction one might take with a 6DOF mouse (common in engineering and gaming communities), a trackball, a presentation mouse, and any other commercially available HID. Other embodiments create new user interactions with any digital controller (as connected by Bluetooth, Wi-Fi, The Internet of Things (IoT), etc.). This may include, but is not limited to, a TV remote control, projector remote control, or any remote controller for a toy.

Some embodiments of the controller offer a game controller capability for the new worlds of Mixed, Virtual and Augmented Reality. The controller enables open hand gestures with explicit finger tracking and interaction to provide virtual or augmented interaction while still allowing the user to hold or manipulate real-world objects.

In some embodiments, there will be both a left-handed and a right-handed version. The thumb mechanism may support the thumb component on the radial side of the thenar eminence. Some embodiments may support the thumb component from the dorsal side of the thenar eminence. The controller may communicate with a VR headset (or e.g., MR glasses) wirelessly in a VR setting.

In some embodiments, the disclosed invention includes fixtures to attach superficial, cosmetic adornments for user personalization, e.g., on the dorsal side of the ulnar (hypothenar eminence) clasp.

In some embodiments, the controller may house LED features on the palm and dorsal sides to use as a lighting source, or to indicate status of the device or operation, or to and serve as a personalization feature. The LEDs may also serve as an external indication that the controller is specifically an electronics device and unlike any another object, like a weapon.

In some embodiments, the controller may be used in conjunction with VR eyeglasses, enabling the user to interact with the digital world (e.g., the IoT) in a convenient and unobtrusive way. For example, a user may wear MR glasses that are capable of projecting images that appear in the user's field of view, in this case a computer screen. As the user is wearing the disclosed invention on both hands, the user may interact with the project image as if the user were physically in front of a screen, touching it. The user will feel the contact sensations from the interaction through the fingertip haptic displays on the controller. Larger hand gestures are measured and transmitted by the hand controller such that the user's touches, swipes, presses, waving, pointing, sliding, or pinching, etc., controls the interaction with the virtual object in an immersive and satisfying way. As with the scenario pictured, the disclosed invention replaces the need for a conventional mouse or keyboard for computer interaction.

Figure 11:
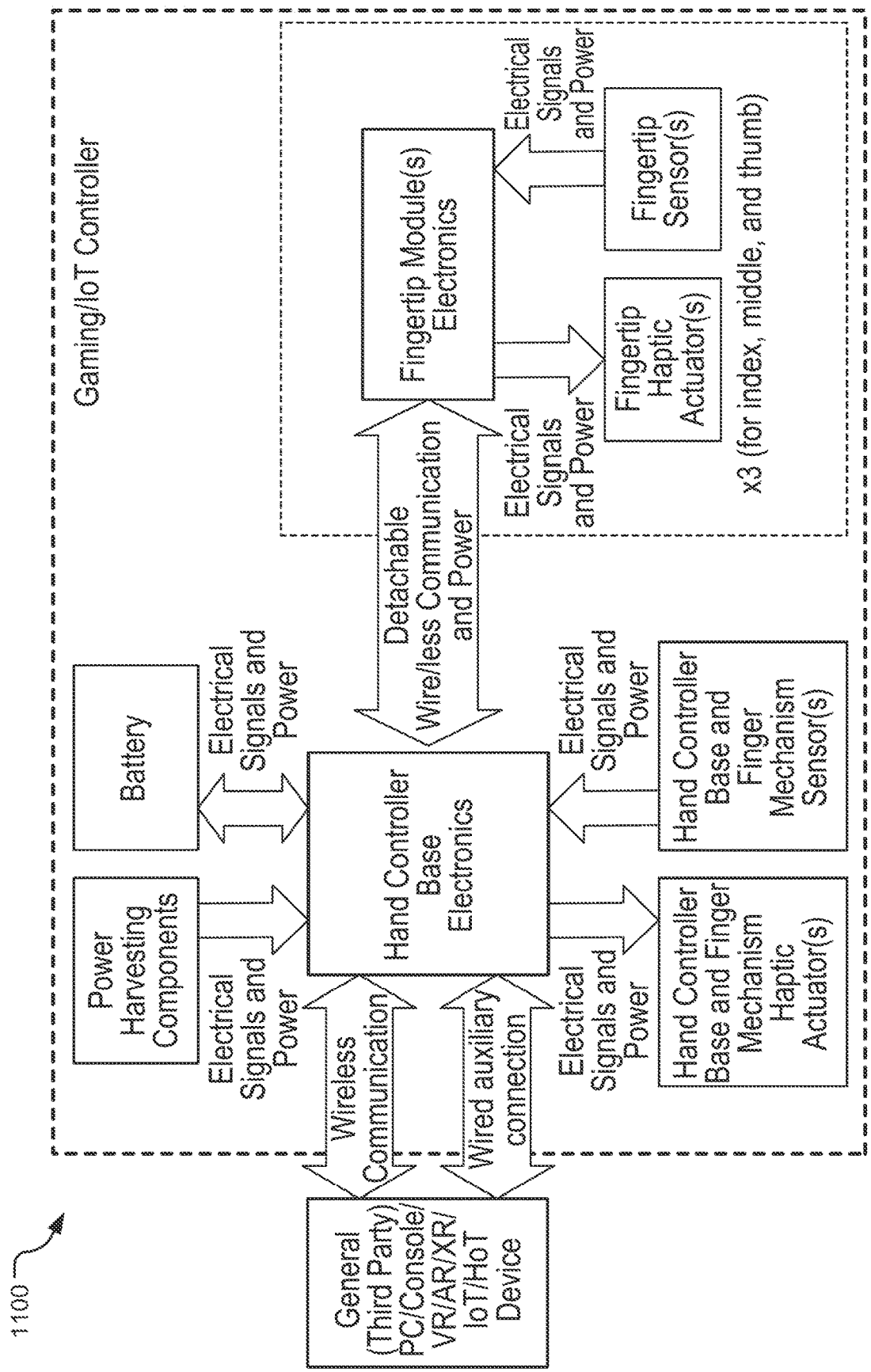
FIG. 11 is a block diagram showing signal connectivity of an example controller.

FIG. 11 is a block diagram showing signal connectivity 1100 of an example controller. The controller's main electrical components and how the electrical components connect to each other is shown. The box on the left labeled 'General (Third Party) device' represents example external electronics capable of wireless communication, for example those associated with gaming. Some embodiments of the controller electronics include a chipset for wireless connection comprising of Wi-Fi, Bluetooth, RF, or optical wireless communication protocols. An additional, wired connection between the gaming controller and external electronics serves as a testing, debug, hard-wired power connection, and backup communication connection, e.g., a USB port.

The abbreviation 'HoT' stands for the "Haptics of Things," a communication network that includes interaction enabled by the disclosed invention where the user may feel unique sensations, or haptic signatures, associated with a particular brand of electronics or digital device IoT.

FIG. 11 illustrates the signal flow within the disclosed controller with respect to sensing and control and may support all industry interface and communication protocols associated with HID and WebVR input devices. All connections within the dotted box labeled 'Gaming/IoT Controller' are wired connections with the exception of connections to the finger/thumb tip module electronics, which may additionally be wireless. The main electrical components include, but are not limited to, electrical power harvesting, battery power and recharge, any haptic actuators mounted to the transverse structure or hypothenar palm or dorsal clasping mechanism, hand clasp or transverse structure sensors, the finger mechanisms actuators and harvesters, and any finger mechanism sensors. Additional hand controller base electronics may include LED display and solar panel power acquisition.

The types of sensor signals between components within the disclosed controller may include joint angle encoders or hall effect sensors, clasp force or tension sensors, inertial measurement unit sensors (IMU), camera-based sensors for IMU supplementation, temperature, thermal conductivity, moisture, capacitive, electromagnetic, electrical power flux to and from the battery, associated wireless charging electronics, and vibration sensors from the base structure or finger mechanisms. The connections to the fingertip components are detachable, and optional, and may be hardwired through the mounting post connection or wirelessly connected. Some embodiments include up to three finger or thumb components. The electrical components in the disclosed controller together enable sensing, interaction, and control of all external electronic devices that have wireless external input interface capability, such as (but not limited to) a gaming headset or console, any remotely controlled appliance like a television, remotely controlled toy, or smart home appliances that communicate through a wireless hub.

Figure 12:
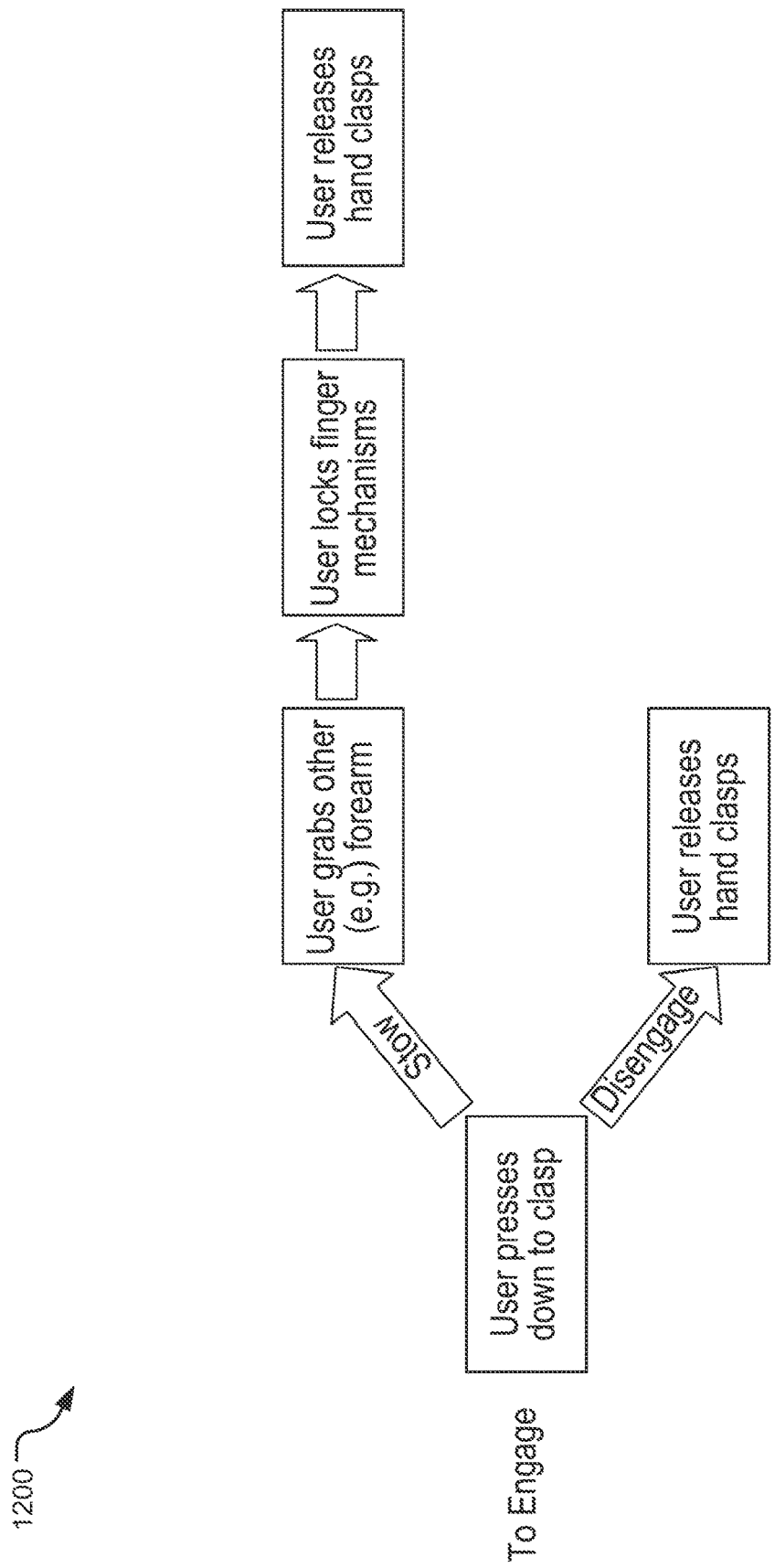
FIG. 12 is a flowchart of example operations to engage, stow, and disengage an example controller.

FIG. 12 is a flowchart of example operations 1200 to engage, stow, and disengage an example controller utilizing the hand clasp functionality of the disclosed invention is independent of the position of the finger mechanisms, and because of that, the user may engage or disengage the hand controller with the finger mechanisms in any state. Therefore, if the user wishes to disengage from the hand controller temporarily but does not have a flat surface with which to place the controller, the sequence of events in FIG. 12 illustrates the steps to "hook on," or "claw" on to another object. Presumably, the most convenient object available is the user's other arm.

The steps in operations include first engaging the device by pressing down with the palm to clasp. Once engaged and to temporarily stow the controller, the user grabs (e.g.) his or her other arm with the controller fingers and thumb bent around the arm. The user then locks the finger and thumb mechanisms in place with a verbal, digital, or physical button press on the controller. Finally, by issuing a 'disengage' command with a button release or other digital command, the hand clasps open and the controller is temporarily stowed in place finger mechanism locking capability.

Because the disclosed controller is in constant contact with both the skin on the user's palm as well as fingertips, it enables transient and persistent haptic sensations between two or more sensitive areas on the user's hand, for example, between the index finger pad and the hypothenar eminence palm. The disclosed controller may, for example, display coordinated skin stretching at both the palm and fingers to create the greater sensation of shape, or weight when holding a virtual object. The controller may display transient vibrations that "traverse" the hand from the palm to the fingers, or vice versa. Transient sensations may be displayed periodically, like a wave, from finger to finger and then to the palm to create a sensation of movement. If the haptic components (displays) at the fingertips and palm are capable of displaying hot and cold sensations, the controller may display, for example, the sensation of progressively dipping one's hand in water. The modular capability of the controller's fingertip components provides the means to select and customize a nearly infinite combination of haptic sensations between the palm and the fingers on the user.

In some embodiments of the disclosed technology, the controller uses hand motions and measured finger pose and motions to translate sign language into digital input. The electronics detect when the user has formed a recognizable letter in sign language, or if any corresponding motion coincides with known sign language words or phrases and transmits the translation digitally. Furthermore, the controller can simply transmit one user's hand and finger motions to another user on a different controller, relaying the hand and finger pose and motion activity in real time. With one controller following another controller's motion, like a mimic, haptic communication in any form is enabled (whether it conforms to a given sign language protocol or not).

In some embodiments of the disclosed technology, the finger mechanism combines the printed circuit boards and the electromagnetic solenoid approach. For example, if both embodiments are used at the same time, one embodiment may be used for power harvesting exclusively while the other is used for haptic display exclusively, or any combination thereof.

The disclosed device may be used as a haptic communication device, sending haptic sensations between more than one device, either on the same user or on different users. The content of the communication is hand and finger motion, and displayed sensations with their associated signals, and may include but are not limited to pressure, vibrotactile, or skin stretch stimulus on the fingers, palm, or any combination thereof. In some embodiments, the sensations may be communicated to other parts of a user's body in an implementation where the device is intended for other parts of the body (e.g., a user's back or neck). Additional haptic content includes indirect kinesthetic haptic sensations such as those derived from finger pose and hand movement as those signals are transmitted or received. Some embodiments of haptic communication take the sensory signals from one device, such as the force or pressure sensors in the fingers, and through the wireless communication transform and display those signals as haptic sensations on another device, either in an equivalent form (such as applying pressure when force is sensed) or as a substitution, including but not limited to displaying vibration in one user based on signals of force in another user on a different device.

Some embodiments of haptic communication with the disclosed device include sensing or receiving haptic signals from a broadcast where many devices are connected to a single device (which may be a disclosed device itself, or may also include any electronics device connected wirelessly, e.g., with the IoT). The content of such haptic communication may be sensations associated with an interaction, a transient event, a condition, or any other aspect of the electronics as desired by a manufacturer of said electronics.

Any haptic or indirect haptic content. i.e., a hint, received, transmitted, and displayed between an IoT connected device and the disclosed device, or between more than one disclosed device, based on user interaction or state (such as presence), is defined here and described as the Haptics of Things (HoT).

Prescribed use of the HoT with the disclosed device may include but is not limited to personal haptic communication between users' devices, sign language display and interpretation between two or more users, VR/AR/MR haptic content display and interaction control, as a computer peripheral device interaction (e.g., HID), or as any hint with an IoT device. Some embodiments of the HoT include using the haptic display capabilities of the disclosed device on other human anatomy than the hand and fingers. The disclosed device may display direct or indirect haptic sensations due to a hint received or transmitted through the HoT on any body part, wherever the user can reach with their hand. This implementation includes receiving signals from and displaying to all parts of the head and face, all erogenous zones on the body including genitalia, or a body orifice.

Some embodiments of HoT interactions through the disclosed device include, for example, one user sending hint-over-HoT signals to control another user's device while that other user is in contact with a third person's body. Thus, the disclosed device extends the HoT between all users of the disclosed device, and to any other user in contact with said device on either end of the communication path. For example, a doctor wearing a disclosed device may remotely receive HoT information (e.g., a pulse) from a patient through a disclosed device worn by an attending nurse pressing his or her fingers against the patient's neck.

Figure 13:
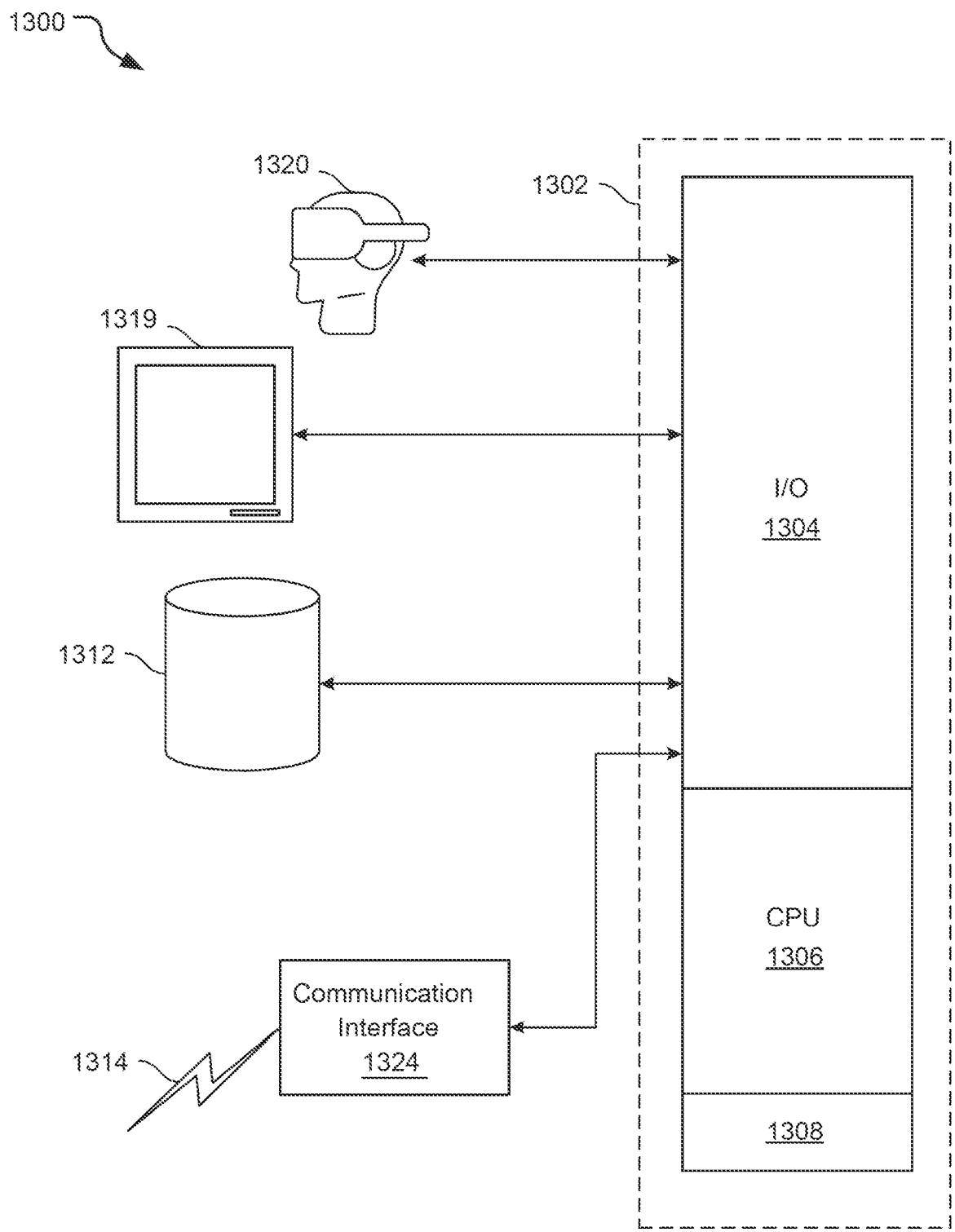
FIG. 13 illustrates a block diagram of a computer system in the disclosed system.

Referring to FIG. 13, a block diagram of a computer system 1300 suitable for implementing one or more aspects of a HoT system and the disclosed controller is shown. The computer system 1300 is capable of executing a computer program product embodied in a tangible computer-readable storage medium to execute a computer process. Data and program files may be input to the computer system 1300, which reads the files and executes the programs therein using one or more processors. Some of the elements of a computer system 1300 are shown in FIG. 13 wherein a processor 1302 is shown having an input/output (I/O) section 1304, a Central Processing Unit (CPU) 1306, and a memory section 1308. There may be one or more processors 1302, such that the processor 1302 of the computing system 1300 comprises a single central-processing unit CPU 1306, or a plurality of processing units. The processors may be single core or multi-core processors. The computing system 1300 may be a conventional computer, a distributed computer, or any other type of computer. The described technology is optionally implemented in software loaded in memory section 1308, a disc storage unit 1312, and/or communicated via a wired or wireless network link 1314 on a carrier signal (e.g., Ethernet, 3G wireless, 5G wireless, LTE (Long Term Evolution)) thereby transforming the computing system 1300 in FIG. 13 to a special purpose machine for implementing the described operations.

The I/O section 1304 may be connected to one or more user-interface devices (e.g., a keyboard, a touch-screen display unit 1318, a VR headset 1320, any device connected to the IoT, the disclosed controller, etc.) or a disc storage unit 1312. Computer program products containing mechanisms to effectuate the systems and methods in accordance with the described technology may reside in the memory section 1308 or on the storage unit 1312 of such a system 1300.

A communication interface 1324 is capable of connecting the computer system 1300 to an enterprise network via the network link 1314, through which the computer system can receive instructions and data embodied in a carrier wave or commutated on a carrier wave. When used in a local area networking (LAN) environment, the computing system 1300 is connected (by wired connection or wirelessly) to a local network through the communication interface 1324, which is one type of communications device. When used in a wide-area-networking (WAN) environment, the computing system 1300 typically includes a modem, a network adapter, or any other type of communications device for establishing communications over the wide area network. In a networked environment, program modules depicted relative to the computing system 1300 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module and other modules may be embodied by instructions stored in memory section 1308 and/or the storage unit 1312 and executed by the processor 1302. Further, local computing systems, remote data sources and/or services, and other associated logic represent firmware, hardware, and/or software, which may be configured to assist in obtaining and processing hints. The HoT network service may be implemented using a general purpose computer and specialized software (such as a server executing service software to a user), a special purpose computing system and specialized software (such as a mobile device or network appliance executing service software), or other computing configurations. In addition, hint parameters may be stored in the memory section 1308 and/or the storage unit 1312 and executed by the processor 1302.

The computer system 1300 may include a variety of tangible processor-readable storage media and intangible processor-readable communication signals. Tangible processor-readable storage can be embodied by any available media that can be accessed by the computer system 1300 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computer system 1300.

In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

The following provides an overview of non-limiting aspects of the present disclosure:

Aspect 1: A controller system comprising: a computer controller to grip on a user's hand with a controller holding force, wherein the computer controller includes: a surface to contact the hand and each finger to display haptic sensations; and a wireless computer interface to communicate externally; and sensors tracking all hand and finger movements and user intention (force, pressure, etc.). In some cases, the controller is configured to provide a holding force to removably attach to the user's hand. In some cases, the holding force may be mechanically activated by a force provided by the user's hand. In some cases, the holding force may be augmented by electronically controlled clasping mechanisms (e.g., one or more solenoids activated by a pressure on a portion of the electronic controller). In some cases, mechanically activated by a force provided by the user's hand. In some cases, user intension may include a pressure exerted on the surface of the electronic controller applied by the user's hand. In some cases, user intention may include a position or orientation of the user's hand (e.g., an okay sign, a thumbs up, a thumbs down, etc.).

Aspect 2. The controller system of aspect 1, wherein the computer controller measures hand position and orientation, finger positions and motions.

Aspect 3. The controller system of aspect 1, further comprising: one or two hinges clasps with user-adjustable spring tension for actuation of the controller holding clasps.

Aspect 4. The controller system of aspect 1, further comprising: actuators to display haptic sensations to the user's palm and or top of the hand.

Aspect 5. The controller system of aspect 1, wherein the computer controller attaches to a user's hand at approximately three to five selected locations.

Aspect 6. The controller system of aspect 1, wherein the computer controller measures wrist angles and motion.

Aspect 7. The controller system of aspect 1, wherein the computer controller is configured for use on a table-top, like a conventional PC controller (mouse).

Aspect 8. The controller system of aspect 1, wherein the computer controller is configured to detach the controller while clasping or hooking onto an external object.

Aspect 9. The controller system of aspect 1, further comprising: a mechanical brake to lock controller finger joints in place.

Aspect 10. The controller system of aspect 1, wherein the computer controller employs two to five finger mechanisms that extend to each finger and thumb with one to three 1D or 2D joints each and housing a mechanical fingertip component port at the distal end.

Aspect 11. The controller system of aspect 10, wherein the computer controller may include a modular fingerpad haptic display component.

Aspect 12. The controller system of aspect 11, wherein the modular fingerpad haptic display component attaches and detaches from the distal finger joint mechanical port.

Aspect 13. The controller system of aspect 12, wherein the modular fingerpad haptic display component contains electronics and actuators that impart haptic sensations like vibration, surface orientation, temperature, shape, or other haptic features to the finger pad.

Aspect 14. The controller system of aspect 12, wherein the modular fingerpad haptic display component has a concave surface for the user's fingerpad, and nominally contains a three-axis force sensor and a rubber pad on the distal side.

Aspect 15. The controller system of aspect 12, wherein the modular fingerpad haptic display component interact (through sensors and actuators) with other fingerpad components to produce haptic sensations, such as a finger snap.

Aspect 16. The controller system of aspect 10, wherein the finger mechanisms are flexures or hinged segments that lie between the fingers of the user.

Aspect 17. The controller system of aspect 10, wherein each finger mechanism has a mechanical port or interface near the distal finger joint where separate components may optionally attach.

Aspect 18. The controller system of aspect 10, wherein the finger mechanisms contain electrical connections (signal and power) between the palm and the distal finger joint port.

Aspect 19. The controller system of aspect 10, wherein the finger mechanisms contain electronics to harvest power from the user's finger motions or force.

Aspect 20. The controller system of aspect 10, wherein the finger mechanisms can apply active or passive force to the distal finger joint through one or more of the finger mechanism components, e.g., the fingertip component mounting post.

Aspect 21. A device enabled standard HID interactions in Virtual Reality, Augmented Reality, and in the "real world" such as a fancy computer mouse. The device enables digital and haptic interactions with all products connected through the IoT.

Aspect 22. The device of aspect 21, wherein it enables the broadcast of haptic sensations from one to many users, or vice-versa, in virtual or augmented settings.

Aspect 23. The device of aspect 22, wherein it specifically excludes the use of a dorsal strap to enable single-hand engagement and disengagement.

Aspect 24. A method comprising: gripping, with a holding force, a user's hand at key locations on a palm of the user's hand with a computer controller; performing closed or open hand motions; contacting a surface of the computer controller to each finger to deliver transient or persistent haptic sensations; and providing tracking hand and finger movements with a wireless computer interface.

Aspect 25. The method of aspect 24, wherein the holding force is one of active and passive.

Aspect 26. The method of aspect 24, further comprising: measuring orientation and position of a user's hand; and measuring finger location and force.

Aspect 27. The method of aspect 24, further comprising: engaging or disengaging a controller's grip with a singular user interaction.

Aspect 28. The method of aspect 27, wherein the singular user interaction is a downward palm press or button.

Aspect 29. The method of aspect 24, further comprising: employing one or two hinges with user-adjustable spring tension for actuation of the holding force.

Aspect 30. The method of aspect 24, further comprising: holding onto a user's hand with the controller at approximately three to five selected locations.

Aspect 31. The method of aspect 24, wherein it employs a specific geometry of contact to the user's palm, as well as the top of the hand to maximize natural hand movement.

Aspect 32. The method of aspect 1, further comprising: displaying haptic sensations to the user's palm and or top of the hand with actuators.

Aspect 33. A system, comprising: a communications network; and a hint transmitted by the communications network to at least one human interface device, the hint displaying touch sensation.

Aspect 34. The system of aspect 33, wherein the hint displays at least one of finger position, finger motion, sensory information, tactile touch sensation, and kinesthetic touch sensation.

Aspect 35. One or more tangible computer-readable storage media encoding computer-executable instructions for executing on a computer system a computer process, the computer process comprising: transmitting sensor signals; delivering touch sensation; and displaying hand and finger position and or motion on a human interface device.

It should be noted that the techniques and aspects described herein describe possible implementations, and that the operations and the steps may be rearranged or otherwise modified and that other implementations are possible. Further, aspects from two or more of the techniques or methods may be combined.

The invention claimed is:

1. An electronic controller comprising:
an assembly configured to single-handedly engage with a user's hand comprising:
a transverse structure;
a hand clasp and a base clasp connected to the transverse structure with at least one hinge and configured to engage and disengage the assembly from the user's hand;
a first finger portion connected to the transverse structure and configured to display haptic sensations that include both tactile and kinesthetic sensations; and
an electronic module operatively coupled to the assembly, the electronic module comprising:
a processor; and
memory coupled with the processor, with instructions stored in the memory, the instructions being executable by the processor to cause the electronic controller to:
provide signals to the first finger portion for displaying the haptic sensations.

2. The electronic controller of claim 1, further comprising a thumb portion configured to display the haptic sensations, and
wherein the instructions are further executable by the processor to cause the electronic controller to:
provide signals to the thumb portion for presenting the haptic sensations.

3. The electronic controller of claim 2, further comprising:
a first transverse section;
a second transverse section;
a first elongate member coupled to a first transverse section; and
a second elongate member coupled to a second transverse section, wherein the thumb portion is coupled to the first elongate member and the first finger portion is coupled to the second elongate member.

4. The electronic controller of claim 3, wherein the first transverse section is configured to extend across at least a portion of a user's hand-proximate to a palm of the user's hand.

5. The electronic controller of claim 3, wherein the second transverse section is configured to extend across at least a portion of a user's hand and configured to avoid contact with or impeding the thenar portion of the user's hand, the thenar eminence portion of the user's hand, and the hypothenar eminence portion of the user's hand.

6. The electronic controller of claim 1, wherein the instructions are further executable by the processor to cause the electronic controller to:
track user intent of the user with sensors on the electronic controller;
measure the tracked user intent; and
translate the user intent responsive to measuring the tracked user intent.

7. The electronic controller of claim 1, wherein the instructions are further executable by the processor to cause the electronic controller to:
translate user intent into digital input; and
perform computer input functions and computer output functions responsive to translating the user intent into digital input.

8. The electronic controller of claim 1, wherein the instructions are further executable by the processor to cause the electronic controller to:
transmit a hint via a communications network to or from at least one human interface device, wherein the hint displays at least one of finger position, finger motion, sensory information, tactile touch sensation, and kinesthetic touch sensation.

9. The electronic controller of claim 1, further comprising:
a dorsal section configured to engage at least a portion of the user's hand proximal to a side of the user's hand opposite a thumb of the user's hand, and
wherein the instructions are further executable by the processor to cause the electronic controller to:
provide signals to the dorsal section for presenting the haptic sensations to the user's hand.

10. The electronic controller of claim 1, wherein the electronic controller is configured to simultaneously display the haptic sensations to the user's hand and to individual fingertips in concert with the user's finger motion or position.

11. An electronic controller comprising:
a fastening assembly configured to single-handedly engage and disengage with a user's hand, the fastening assembly comprising:
a transverse structure;
a hand clasp and a base clasp connected to the transverse structure with at least one hinge and configured to engage and disengage the assembly from the user's hand;
a finger portion coupled to the transverse structure, the finger portion comprising a finger mechanism configured to generate user intent; and
an electronic module operatively coupled to the fastening assembly, the electronic module comprising:
a processor; and
memory coupled with the processor, with instructions stored in the memory, the instructions being executable by the processor to cause the electronic controller to:
translate the user intent into digital input; and
perform computer input functions and computer output functions responsive to translating the user intent.

12. The electronic controller of claim 11, wherein the electronic controller clasps the palmar side of a user's hand during use.

13. The electronic controller of claim 11, further comprising:
a clasping mechanism configurable to mechanically engage with the user's hand in a first fixably movable orientation to hold the electronic controller to the user's hand, and wherein the clasping mechanism is further configurable to mechanically disengage with the user's hand in a second fixably movable orientation to enable the electronic controller to be removed from the user's hand.

14. The electronic controller of claim 13, wherein the instructions are further executable by the processor to cause the electronic controller to:
- track user intent of the user with sensors;
- measure the tracked user intent; and
- translate the user intent responsive to measuring the user intent to control a graphical user interface.

15. The electronic controller of claim 14, wherein the instructions are further executable by the processor to cause the electronic controller to:
- transmit a hint via a communications network to or from at least one human interface device, wherein the hint displays at least one of finger position, finger motion, sensory information, tactile touch sensation, and kinesthetic touch sensation.

16. A method of operating the electronic controller of claim 11 comprising:
- providing signals to a first finger portion of the electric controller for presenting haptic sensations that include both tactile and kinesthetic sensations to a dorsal side and a palmar side of a user's hand.

17. The method of claim 16, further comprising:
- tracking user intent of the user with sensors on the electronic controller;
- measuring the tracked user intent; and
- translating the user intent responsive to measuring the tracked user intent.

18. The method of claim 17, further comprising:
- translating the user intent into digital input; and
- performing computer input functions and computer output functions responsive to translating the user intent into digital input.

19. The method of claim 18, further comprising:
- transmitting a hint via a communications network to or from at least one human interface device, wherein the hint displays at least one of finger position, finger motion, sensory information, tactile touch sensation, and kinesthetic touch sensation.

* * * * *